March 10, 1959  F. M. NEIGHLY, SR  2,876,995
PERCUSSION DRILLS
Filed Sept. 2, 1954

INVENTOR
Francis M. Neighly, Sr.

United States Patent Office 2,876,995
Patented Mar. 10, 1959

2,876,995

PERCUSSION DRILLS

Francis M. Neighly, Sr., Latrobe, Pa.

Application September 2, 1954, Serial No. 453,756

6 Claims. (Cl. 255—63)

This invention relates to percussion drills and particularly to a percussion drill bit for masonry and like materials wherein the drill bit is operated by successive blows on the end thereof coupled with rotation either continuously or intermittently.

Percussion drills have long been used in drilling masonry or the like and many varieties and shapes of percussion drills have been proposed. The drilling of masonry is a particularly difficult operation for a metal tool and there have been many problems in the art which have remained unsolved. Most, if not all, of the drills which have heretofore been available have been unable to satisfactorily carry out and remove the cuttings of masonry formed at the bottom of the hole without requiring the removal of the drill at intervals. Moreover, most of the drills heretofore proposed tended to cut off-center and to drill a nonuniform hole in the masonry. Many of the percussion drills which have been heretofore proposed have, moreover, been patterned after metal and wood drills and the bevels and cutting edges require careful and frequent grinding and even with this care the drills are not satisfactory.

I have invented a percussion drill which overcomes the difficulties inherent in all of the percussion-type drills heretofore proposed. I provide a drill having a tip in the form of a regular triangular pyramid with the corners of the base cut off on an arc to form lands. Each of the sides of the base of the pyramid is continued in the shank of the drill in a spiral to form flats between the lands, each such flat being separated by a narrow arcuate land identical with the land formed at the corners of the base by the pyramid. Preferably I provide at the end of the drill opposite the cutting tip a shank in the form of a frustum of a cone having a taper of one and one-quarter inch per foot. I have found that the drill of this invention will cut a constant circumference opening, that the flats will clear the opening as the drill proceeds into the masonry and that the drill is free from vibration along the flats and transmits the maximum amount of force from the tip to the shank without packing of the masonry dust along the flats. As a result I am able, not only to drill a more perfect hole, but am able to prevent jamming of the drill in the hole as frequently occurs with the conventional masonry drills heretofore proposed.

In the foregoing statement I have described certain salient features, advantages and objects of my invention. However, other objects and advantages will become apparent from a consideration of the following description and accompanying drawings wherein.

Figure 1:
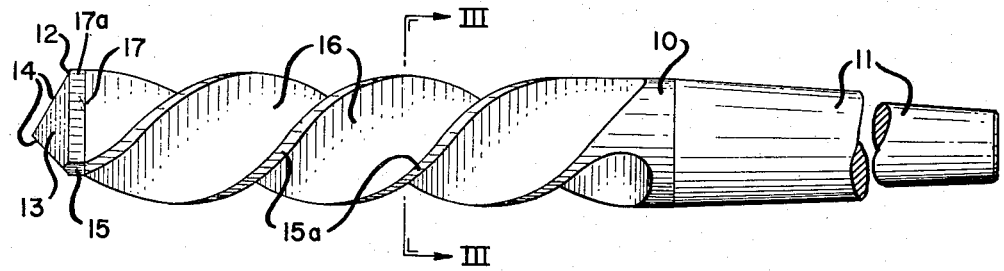
Figure 1 is a side elevation of a drill bit according to my invention.
Figure 2:
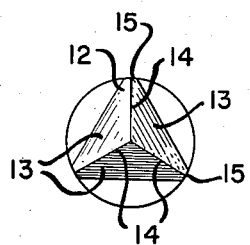
Figure 2 is an end elevation looking at the cutting end of the drill.
Figure 3:
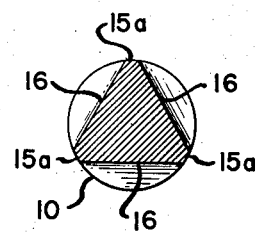
Figure 3 is a section on the line III—III of Figure 1.

Referring to the drawings I have shown the preferred embodiment of a drill bit according to my invention. The drill is provided with a body portion 10 having a shank 11 in the form of an elongated frustum of a cone preferably with a taper of one and one-quarter inch per foot. This shank is adapted to be received in a suitable holder either of the manual or power-driven type such as the conventional electric percussion drill. The cutting tip or point of the drill is formed in the shape of a regular triangular pyramid 12 having three flat planes 13 intersecting along three intersecting lines 14 forming cutting edges and having a flat substantially triangular base 17a. Each of the three base corners of the pyramidal tip is cut off to form arcuate lands 15 (see Figure 2) intersecting the planes 13 of the pyramidal tip. The body portion of the drill 10 is provided with three spiral surfaces 16 of straight line section beginning at the base line 17 of the pyramidal tip and extending to a point adjacent the shank 11. Each of the surfaces 16 is separated by a spiral arcuate land 15a (see Figure 3) beginning at the cut-off portion 15 of the corners of the pyramid and extending to the termination of the surfaces 16 adjacent the shank. The spiral surfaces 16 of straight line cross section may be formed by cutting them into the finished drill stock or by cutting material from the bar to leave a slightly convex surface and then twisting on a 30° helix to form the spiral surfaces of straight line cross section as shown in Figure 3.

I have found that by this construction the point and shape of the pyramid causes the drill to stay on a single axis and therefore to drill a hole of substantial constant circumference. At the same time the shape of the flute provides the maximum strength in the body of the drill, avoids concave portions into which the released masonry packs and prevents the vibration along the drill stem which tends to pack the masonry dust in the flutes of conventional-type drills. At the same time the drills of this invention are more easily and quickly fabricated with less intricate machine work than any of the percussion drills heretofore available. The drill of this invention is fast-cutting and is self-cleaning to a degree which has not been heretofore possible in masonry drills and the resulting holes drilled by it are of more uniform circumference.

While I have illustrated and described a present preferred embodiment of my invention it will be understood that it may be otherwise embodied within the scope of the following claims.

I claim:

1. A percussion drill comprising an elongated body portion, a triangular pyramidal point on one end of said body portion, spiral surfaces of straight line cross section equal in number to the sides of the pyramidal point spaced at substantially equal arcuate distances around the body portion and spiral arcuate lands separating said surfaces, each of said lands including a surface on the pyramidal point formed by cutting off the base corners of the pyramid on an arc.

2. A percussion drill comprising an elongated body portion, a triangular pyramidal point on one end of said body portion, said point being formed by three flat intersecting surfaces, three spiral surfaces of straight line cross section extending along the body portion from the sides of the base of the pyramidal point and three narrow spiral arcuate lands separating said surfaces, each of said lands including a surface on the pyramidal point formed by cutting off the base corners of the pyramid on an arc.

3. A percussion drill as claimed in claim 2 wherein the three spiral surfaces have a helical pitch of about 30°.

4. A percussion drill as claimed in claim 2 wherein the body portion is provided with a frusto-conical shank at the end opposite the pyramidal point, said shank having a taper of about one and one-quarter inch per foot of length.

5. A percussion drill having a triangular pyramidal point, spiral surfaces of straight line cross section equal in number to the sides of the pyramidal point spaced around the body portion and separated by equally spaced narrow spiral arcuate lands, said spiral lands including a surface on the pyramidal point formed by cutting off the base corners of the pyramid on an arc.

6. A percussion drill having a triangular pyramidal point formed by three flat intersecting surfaces in the form of isosceles triangles, three spiral surfaces of straight line cross section spaced at substantially equal arcuate distances around the body portion and separated by equally spaced narrow spiral arcuate lands, said spiral lands including a surface on the pyramidal point formed by cutting off the base corners of the pyramid on an arc.

References Cited in the file of this patent

UNITED STATES PATENTS

| | | |
|---|---|---|
| 1,964,030 | Brush | June 26, 1934 |
| 2,217,202 | Gelpcke | Oct. 8, 1940 |
| 2,404,048 | Gepfert | July 16, 1946 |

FOREIGN PATENTS

| | | |
|---|---|---|
| 551 | Great Britain | Jan. 10, 1893 |
| 260,878 | Great Britain | Nov. 11, 1926 |